UNITED STATES PATENT OFFICE.

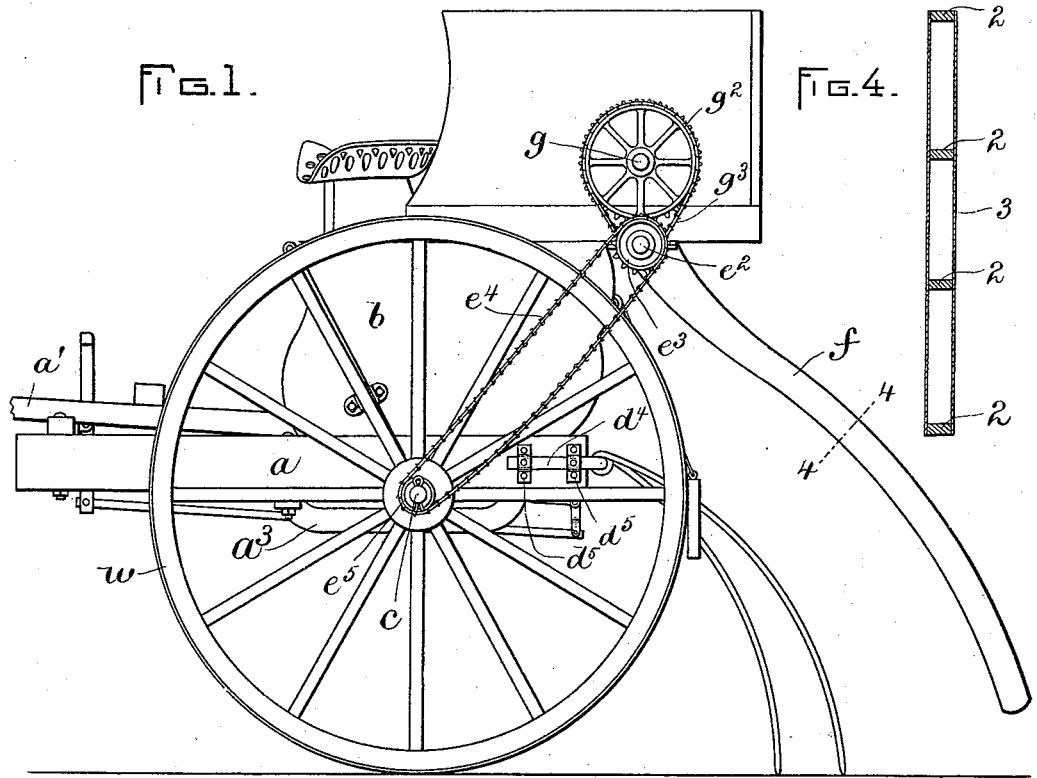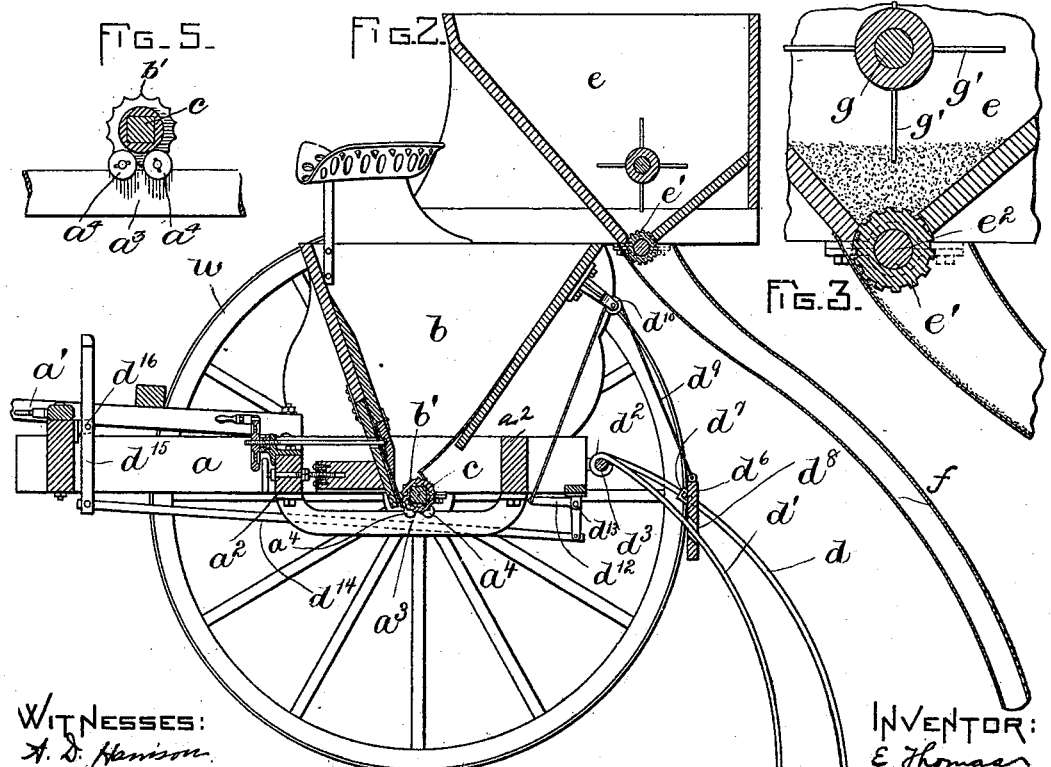

ELEAZER THOMAS, OF ROCK, MASSACHUSETTS.

FERTILIZER AND SEED DISTRIBUTER.

SPECIFICATION forming part of Letters Patent No. 544,470, dated August 13, 1895.

Application filed April 24, 1895. Serial No. 546,981. (No model.)

*To all whom it may concern:*

Be it known that I, ELEAZER THOMAS, of Rock, in the county of Plymouth and State of Massachusetts, have invented certain new and useful Improvements in Fertilizer and Seed Distributers, of which the following is a specification.

This invention has for its object to provide a simple and efficient machine for simultaneously distributing a fertilizer upon the surface of the ground, mixing the same with the earth, and depositing seeds upon the earth at the rear of the point where the fertilizer is deposited.

The invention consists in the several improvements which I will now proceed to describe and claim.

Of the accompanying drawings, forming a part of this specification, Figure 1 represents a side elevation of a machine embodying my invention. Fig. 2 represents a vertical central section of the same. Fig. 3 represents an enlargement of a portion of Fig. 2. Fig. 4 represents a section on line 4 4 of Fig. 1. Fig. 5 shows a sectional view, on an enlarged scale, of certain parts appearing in Fig. 2.

The same letters and numerals of reference indicate the same parts in all of the figures.

In the drawings, $a$ represents a supporting-frame, which may be of any suitable form and construction and may be provided with thills or shafts $a'$ for attachment of a horse to the machine.

$b$ represents a vertical receptacle mounted upon the frame, said receptacle having a discharging-opening at its lower portion, in which is located a feed-roll $b'$, which is affixed to the axle $c$, on which the driving-wheels $w\ w$ are mounted, the arrangement being such that the rotation of said wheels rotates the axle and feed-roll when the wheels are operatively connected with the axle with the usual clutch mechanism provided for that purpose, said clutch mechanism adapting the wheels to be made loose upon the axle when it is not desired to rotate the feed-roll.

The construction of the fertilizer-receptacle and the feed-roll, together with the means for regulating the discharge of the fertilizer by the rotation of the feed-roll, is or may be the same as set forth in my Letters Patent No. 533,252, granted to me January 29, 1895, with the exception of a transverse stay-bar $a^3$, which I have added to the frame of the machine for the purpose of supporting the central portion of the feed-roll $b'$, said stay-bar extending across and below the feed-roll and being attached at its ends to cross-bars $a^2\ a^2$ of the supporting-frame. The central portion of the stay-bar is provided with antifriction-rollers $a^4\ a^4$, upon which rests a smooth or unfluted section of the feed-roll $b'$, as shown in Fig. 5. The stay-bar prevents the feed-roll from being sprung or displaced in any direction by contact with lumps of hard material in the fertilizer. The stay-bar also prevents the frame from spreading at its central portion.

$d$ and $d'$ represent curved harrow-teeth, the upper ends of which are formed with eyes $d^2$, which are mounted to oscillate upon a horizontal rod $d^3$, the bent ends $d^4$ of which are fixed by brackets or clips $d^5$ to the supporting-frame $a$. The teeth $d\ d'$ pass through an adjusting-bar $d^6$, which has orifices or sockets to receive said teeth, said orifices being the preferred form, so that the teeth $d$ occupy a position behind the teeth $d'$. The bar $d^6$ is preferably provided with sockets $d^7$, which are fixed by set-screws or otherwise to the teeth $d$, while the teeth $d'$ pass loosely through enlarged orifices $d^8$ in said bar, the attachment of the bar to the teeth $d$ keeping the bar from swinging or moving loosely upon the teeth. To the bar $d^6$ are affixed cords $d^9$, passing over pulleys $d^{10}$, mounted in bearings on the receptacle $b$. Said pulleys are connected to bell-crank levers $d^{12}$, which are pivoted at $d^{13}$ to the supporting-frame, and are connected by rods $d^{14}$ to a foot-lever $d^{15}$, which is pivoted at $d^{16}$ to the supporting-frame and is adapted to be moved by the foot of the operator to raise the bar $d^6$ and the teeth $d\ d'$ when it is desired that said teeth shall be above the surface of the ground. When the lever $d^{15}$ is released, the teeth drop and bear upon the ground by their own weight and that of the bar $d^6$. The teeth $d\ d'$ act to thoroughly mix with the earth the fertilizer discharged from the receptacle $b$, thus preventing any such accumulations of the fertilizer as would be likely to injure the seed deposited upon it by the sowing attachment hereinafter described.

$e$ represents a seed-receptacle, which is affixed to the receptacle $b$, and is preferably arranged above and somewhat at the rear of the same, as shown in Fig. 2. The seed-receptacle has an outlet at its lower portion, in which is located a feed-roll $e'$, affixed to a shaft $e^2$, which is journaled in suitable bearings and is provided with a sprocket-wheel $e^3$, the latter being connected by a chain $e^4$ with a sprocket-wheel $e^5$ on the axle $c$, so that the rotation of said axle is communicated to the feed-roll $e^2$ when the machine is in operation.

$f$ represents a seed-delivering spout, which is composed of a series of stiff arms 2 2, made of wood or other suitable material, affixed to the lower portion of the seed-receptacle or to its supporting-frame, and a covering 3, of cloth, secured to said arms 2 2 and forming a flattened tube, the width of which is practically equal to the length of the seed-receptacle $e$, the upper portion of said tube communicating with the outlet of the seed-receptacle, so that the seed delivered by the feed-roll $e'$ will float down the tube $f$ and be delivered in a thin wide stream upon the ground at a point behind the harrow-teeth.

The seed-receptacle is provided with a rotary stirring or mixing device comprising a shaft $g$, journaled in bearings at the ends of the receptacle $e$, and arms or blades $g'$, rotating from said shaft in position to stir the contents of the seed-receptacle and thus intimately mix the different kinds of seed which may be placed at the same time in the receptacle $e$. The shaft $g$ is provided at one end with a sprocket-wheel $g^2$, which is connected by a chain $g^3$ with a sprocket-wheel affixed to the feed-roll shaft $e^2$.

It will be seen that the seed-tube $f$ enables the seed to be evenly distributed upon the ground without being affected by wind, and also enables the seed-receptacle to be located at any desired height, it being found more convenient to locate the seed-receptacle above the fertilizer-receptacle than at any other point, for the sake of compactness and lightness of construction, the fertilizer-receptacle being thus utilized as a support for the seed-receptacle.

Having thus explained the nature of my invention and described a way of constructing and using the same, though without attempting to set forth all of the forms in which it may be made, or all the modes of its use, what I claim, and desire to secure by Letters Patent, is—

1. In a fertilizer and seed distributer, harrow teeth pivoted to the frame of the machine and depending for contact with the ground between the points of discharge of fertilizer and seed; a bar fastened to one set of harrow-teeth and having holes which receive another set of said teeth out of transverse alignment with the first-named set; and means applied to said bar for elevating the harrow-teeth.

2. The combination of the supporting frame having an axle and driving wheels thereon, the fertilizer receptacle mounted on said frame, and having a feed roll affixed to the said axle, the seed receptacle located behind and above the fertilizer receptacle and having a feed roll and an elongated feed discharge tube, and gearing connecting the feed roll of the seed receptacle with the axle, substantially as and for the purpose specified.

3. The combination of the supporting frame having an axle and driving wheels thereon, the fertilizer receptacle mounted on said frame, and having a feed roll affixed to the said axle, the seed receptacle located behind and above the fertilizer receptacle and having a feed roll and an elongated feed discharge tube, a rotary stirring device in the seed receptacle, and gearing connecting said stirring device and the accompanying feed roll with the axle, substantially as and for the purpose specified.

4. A fertilizer and seed distributer comprising a supporting frame, having an axle and wheels thereon, a fertilizer receptacle having a feed roll affixed to said axle, a seed receptacle having a feed roll geared to the axle, an elongated seed discharge tube, extending from the seed receptacle nearly to the ground behind the fertilizer receptacle, harrow teeth located between the fertilizer receptacle and discharge spout, and means for raising said teeth, substantially as and for the purpose specified.

5. In a seed-distributer, the combination with the seed-receptacle having an elongated discharge opening, of a correspondingly laterally-elongated seed-conduit composed of a number of rigid parallel bars attached to the receptacle and extending downwardly therefrom; and a flexible covering stretched across and attached to the front and rear edges of said bars.

6. The combination with the supporting frame, the fertilizer receptacle mounted thereon, the axle journaled in said frame and extending along the outlet of the said receptacle, said axle having a fertilizer feed roll affixed to it, and the stay bars secured to the supporting frame at opposite sides of the feed roll, and extending across and under the central portions of the feed roll, said stay bar having rollers which support the feed roll, substantially as and for the purpose specified.

7. The combination of the supporting frame, the axle journaled in said frame, the seed receptacle supported by the frame and provided with an elongated discharge tube extending downwardly to a point near the surface of the ground, the feed roll located in the outlet of the seed receptacle, the agitator journaled in the seed receptacle above the feed roll, and connections between the driving axle and the said roll and agitator, as set forth.

In testimony whereof I have signed my name to this specification, in the presence of two subscribing witnesses, this 13th day of April, A D. 1895.

ELEAZER THOMAS.

Witnesses:
T. M. BEARSE,
E. F. WITHAM.